United States Patent Office 2,765,863
Patented Oct. 9, 1956

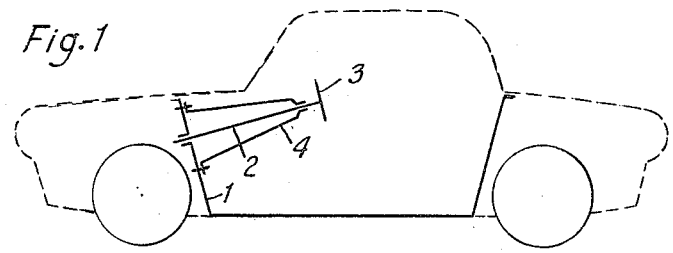
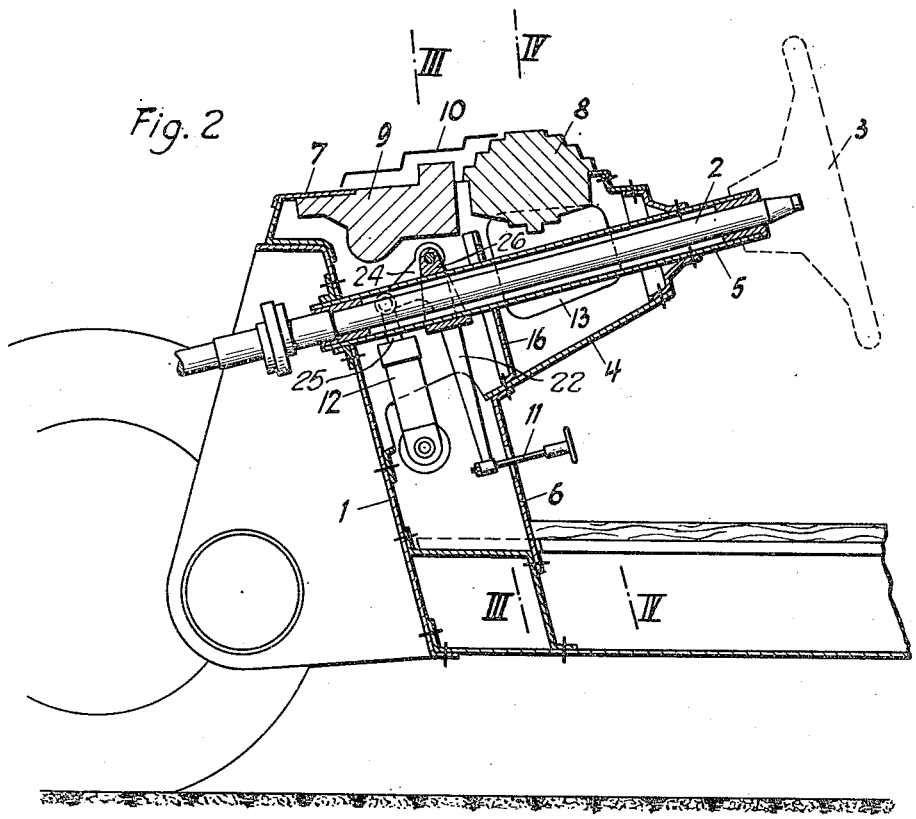
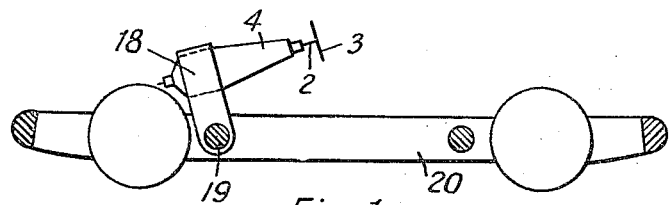

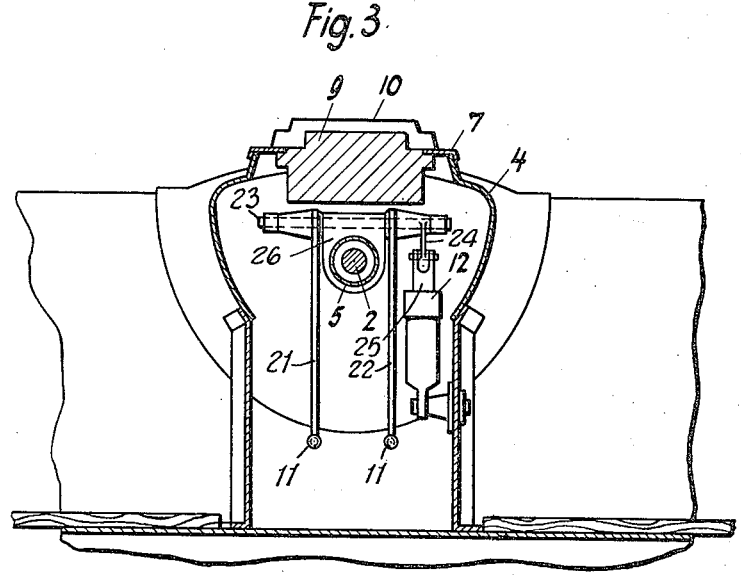
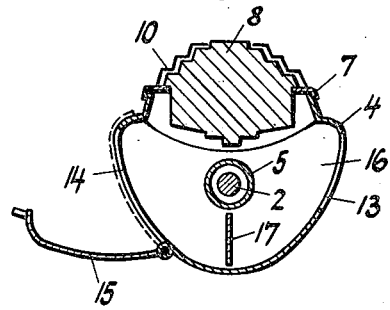

2,765,863

DASHBOARD HOUSING SUPPORT FOR MOTOR VEHICLE CONTROLS

Béla Barényi, Stuttgart (Rohr), Germany, assignor to Daimler-Benz Aktiengesellschaft, Stuttgart-Unterturkheim, Germany Application February 20, 1952, Serial No. 272,680

Claims priority, application Germany February 21, 1951

5 Claims. (Cl. 180—90)

It was hitherto usual with motor vehicles to mount the measuring and control instruments as well as the radio set into an instrument panel located in front of the driver's seat. In this instrument panel there were also in many cases recesses for keeping gloves, tobaccos, motorist maps, etc.

An object of the present invention is to provide new means of accommodation in motor vehicles for the arrangement of the instruments, as well as for the sheltering of small objects, so that the place hitherto used for them becomes free for other purposes. Moreover, an arrangement of these instruments is intended so that the driver of the vehicle can survey them more easily. Furthermore, the instruments should be readily accessible, and a pocket for sheltering small objects should be provided for which is more handy for the driver.

The present invention consists in that the steering column is surrounded with a funnel-shaped box or housing, preferably fixed at the dash-board limiting the driver's compartment in front thereof, and increasing in size or circumference toward this dashboard. According to the present invention the funnel-shaped box or housing is also used for supporting the steering column at its upper end, apart from accommodating the measuring and controlling instruments and providing for stow away spaces.

In order to obtain a clear arrangement and a good mounting of the instruments, it is furthermore proposed to arrange the instruments above the steering column in the upper part of the box wall, and to form this wall preferably on a level, and to fix it in a horizontal or approximately horizontal position.

A good surveying and visual inspection of the measuring and control instrument exists for the driver of the vehicle when the indicating devices or control instruments mounted into the upper wall of the funnel-shaped box are formed drum-shaped, and arranged coaxially one upon another. The diameter of the individual indicating devices is thereby expediently reduced from the bottom to the top, so that the individual indicating devices, or their scales, are offset toward the top like steps. The diameter of the convex surface of each of the drum-shaped indicating devices can also be reduced toward the top, so that each convex surface is somewhat tapered. Thus it is easier to read the scales of the indicating devices.

Moreover, the space existing within the funnel-shaped box or housing, which is closed toward the outside can be used in many different ways. For example, the mountings of the hand, foot and knee levers necessary to operate the vehicle, and the essentials of the rod or linkage guides can be arranged in it. There can also be disposed mechanical, electrical or hydraulic auxiliaries as well as their connections within the funnel-shaped box. The receptacles for small objects are expediently mounted at the two side walls of the funnel-shaped box or housing, so that the driver can easily get at them. Thus the openings of this space can be closed by lids.

The accompanying drawings, illustrates an example of construction according to the present invention in which:

Figure 1 is a schematic longitudinal sectional view of a passenger motor vehicle in accordance with the present invention;

Figure 1a is a view similar to Figure 1 of a modified embodiment in accordance with the present invention;

Figure 2 is a longitudinal sectional view through the steering device of a passenger motor vehicle in accordance with the present invention;

Figure 3 is a cross-sectional view taken along line III—III of Figure 2, and

Figure 4 is a cross-sectional view taken along line IV—IV of Figure 2.

In the different figures in which like reference numerals are used to designate like parts, reference numeral 1 designates the front dash-board of a motor vehicle of any type. A steering column 2 carrying the steering wheel 3 at its upper free end passes through the dash-board 1. The column 2 is surrounded by a funnel-shaped box or housing 4 which is fixed or secured to the dash-board in any conventional manner, as, for example, by bolting, riveting or welding, and which increases in size or circumference in the direction toward the dash-board 1. In the example of construction according to Figure 1, the steering column 2 is supported at the front dash-board 1 by means of the funnel-shaped box or housing 4, which in turn is, for example, bolted thereto by means of bolts or the like, indicated schematically in this figure.

In another embodiment, as shown in Figure 1a, the funnel-shaped housing 4, which again supports the steering column 2, is supported by a bracket or casing 18 which in turn is fastened to the transverse girder 19 of the chassis 20 of the motor vehicle.

In the construction according to Figures 2 to 4, the steering column 2 is housed in a tube or sleeve 5 supported at its upper end in the funnel-shaped housing 4. In this example of construction, a second partition wall 6 is inserted between the driver's compartment and the dash-board 1. The partition wall 6 reaches up to the funnel-shaped housing 4 and confines a space between the walls 1 and 6 which is separated from the driver's compartment by the wall 6. The various parts such as the funnel-shaped housing 4, the sleeve or tube 5, the partition wall 6, and the dash-board 1 may be secured again in any conventional manner as by means of bolts, rivets, spot-welding or the like, the connections of which are also indicated schematically in Figure 2.

The funnel-shaped housing 4 preferably is made of sheet metal. An opening is provided on top of the funnel-shaped housing 4 which is closed by a level lid 7. Several indicating and control instruments are arranged in this funnel-shaped housing 4 at the end thereof facing the steering wheel 3, which in the illustrated embodiment are combined as a unit or unitary instrument cluster 8 so that the indicating devices thereof are drum-shaped and disposed in a step-like manner coaxially one upon the other. A radio set 9 is fixed to the lid 7 in front of the unit 8. The unit 8 and the radio set 9 are covered at the top thereof by a lid 10.

Two pedals 11 which serve for operating, for example, the brakes and the throttle, are mounted on both sides of the tube 5 in the bottom part of the space surrounded by the funnel-shaped housing 4.

The pedals 11 are fixedly connected with levers 21 and 22 of suitable rod or linkage systems which in turn are pivoted about an axle or shaft 23 arranged above the tube 5 transversely to the steering column 2. The upper portions of levers 21 and 22 are formed as bearings for axle 23 thereby effectively constituting guides for the actuating rods or linkages including the levers 21 and 22 connected with the pedals 11. When the pedals 11 are operated, the levers 21 and 22 swing about the axle or shaft 23, whereby, for example, a second lever 24 which is connected with the lever 22 is moved upwardly so as to draw the piston rod 25 out of the cylinder 12. This cylinder 12, for example, may constitute a hydraulically-operated cylinder for operating the brakes (not shown).

Intermediate the two levers 21 and 22 and their respective pivotal mountings on axle 23 is a bracket 26, as shown in Figures 2 and 3, which is substantially triangular in cross section as shown in Figure 2, and which supports the tube 5 by means of its downwardly extending bearing portion surrounding the tube 5 and provided with an appropriate bore therefor.

Lateral openings 13 and 14 are provided in the part of the funnel-shaped housing 4 located on the side thereof rearwardly of the partition wall 6, i. e., located in the direction of the driver's compartment, which can be closed by a lid 15.

Toward the front the space of the hollow body formed by the housing 4 is separated by a partition wall 16, and can be further divided into two halves by a partition wall 17, as shown in Fig. 4 and which, for example, can be used for putting away small objects such as gloves, cigarettes, etc.

The invention can be applied to passenger cars as well as to trucks.

What I claim is:

1. In an automotive vehicle having a front wall defining the front of the driver's compartment, a steering column, a funnel-shaped housing surrounding said steering column, means for fastening said funnel-shaped housing to said front wall, said funnel-shaped housing increasing in circumference in the direction towards said front wall and having an upper substantially horizontal top side, means including said funnel-shaped housing for supporting said steering column on said front wall, and measuring and control instruments located in said funnel-shaped housing in the upper horizontal top side thereof.

2. In an automotive vehicle the combination according to claim 1, further comprising foot and angle levers for operating the automotive vehicle, support means for said foot and angle levers, and rod guides forming parts of said levers, said last-mentioned support means and portions of said rod guides being located within said funnel-shaped housing.

3. In an automotive vehicle the combination according to claim 1, wherein said funnel-shaped housing is provided with storage spaces accessible from the sides thereof, and means including covers for closing said spaces.

4. In a motor vehicle the combination according to claim 2, further comprising mechanical, electrical and hydraulic auxiliary devices and their connections located in said funnel-shaped housing.

5. An instrument and steering shaft supporting device for automotive vehicles comprising a substantially funnel-shaped housing, a wall for said housing, said wall forming the front delimiting wall for the driver's compartment, means for mounting said funnel-shaped housing with the widest portion thereof to said wall, steering means including a steering wheel shaft and a sleeve surrounding said shaft, said steering means extending axially through said funnel-shaped housing, and means including the narrow neck portion of said funnel-shaped housing for supporting said steering means in said wall, said housing being provided with a plurality of predetermined compartments for accommodating accessories.

References Cited in the file of this patent

UNITED STATES PATENTS

| | | |
|---|---|---|
| 1,353,427 | Seguin | Sept. 21, 1920 |
| 1,533,093 | Booth | Apr. 14, 1925 |
| 1,802,004 | Derr | Apr. 21, 1931 |
| 2,091,059 | Tjaarda | Aug. 24, 1937 |
| 2,129,851 | Lee | Sept. 13, 1938 |
| 2,168,939 | Kraeft | Aug. 8, 1939 |

FOREIGN PATENTS

| | | |
|---|---|---|
| 929,263 | France | July 7, 1947 |
| 602,971 | Great Britain | June 7, 1948 |